Aug. 13, 1968 G. E. ROWE 3,397,047
BLOW MOLDING APPARATUS FOR A GLASSWARE FORMING MACHINE
Filed June 15, 1965 3 Sheets-Sheet 1

INVENTOR
GEORGE E. ROWE
BY *McCormick, Paulding & Huber*
ATTORNEYS

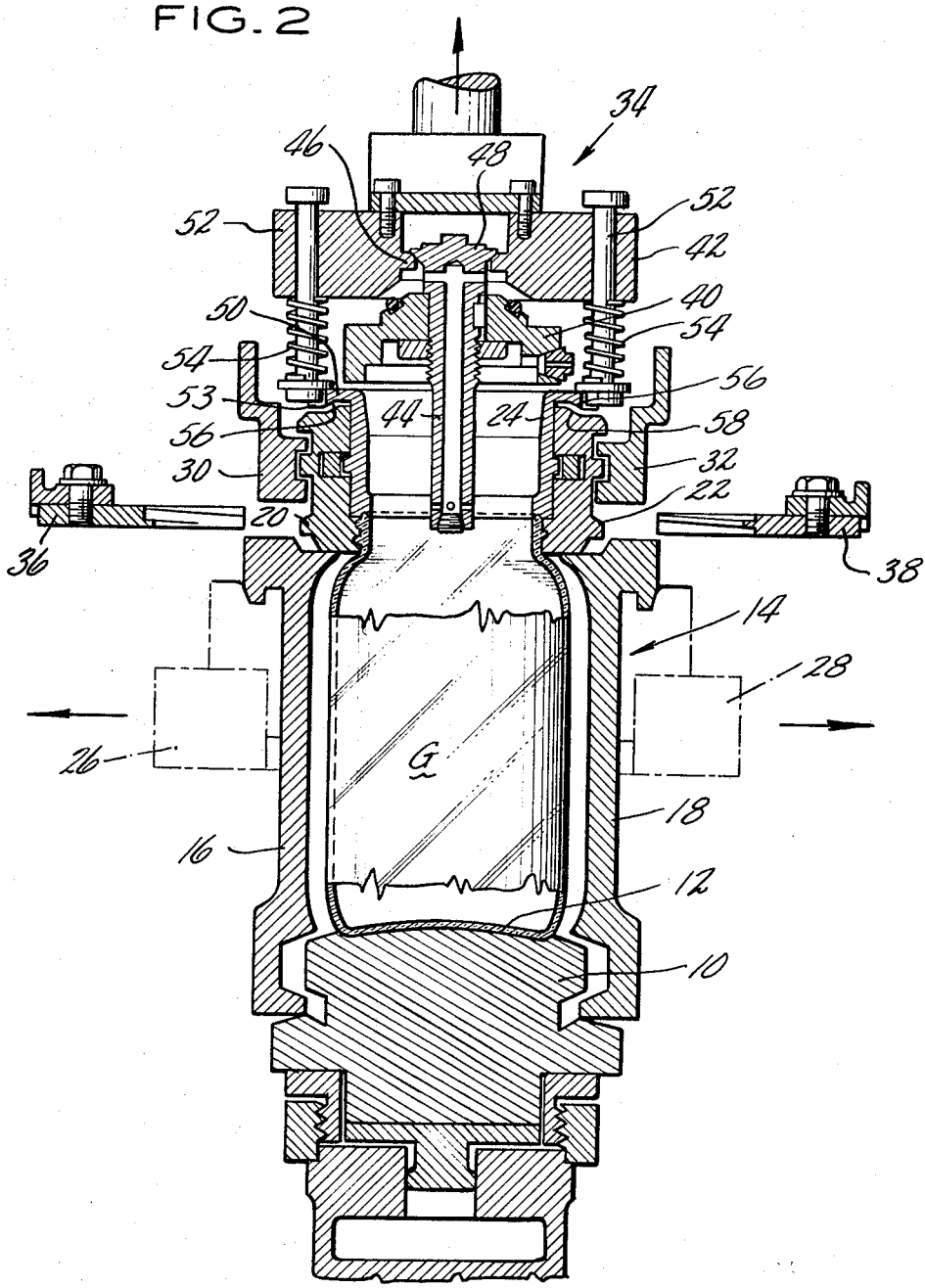

Aug. 13, 1968  G. E. ROWE  3,397,047
BLOW MOLDING APPARATUS FOR A GLASSWARE FORMING MACHINE
Filed June 15, 1965  3 Sheets-Sheet 3

INVENTOR
GEORGE E. ROWE
BY McCormick, Paulding & Huber
ATTORNEYS

# United States Patent Office 3,397,047
Patented Aug. 13, 1968

3,397,047
BLOW MOLDING APPARATUS FOR A GLASSWARE FORMING MACHINE
George E. Rowe, Wethersfield, Conn., assignor to Emhart Corporation, Bloomfield, Conn., a corporation of Connecticut
Filed June 15, 1965, Ser. No. 464,162
7 Claims. (Cl. 65—260)

ABSTRACT OF THE DISCLOSURE

A blow mold used in the final shaping of a previously formed parison in a glassware forming machine wherein the mold apparatus comprises a bottom plate, a body mold, a neck ring, and a thimble within the neck ring, and wherein the thimble is held in engagement with the top or "finish" of the finally shaped article of glassware to prevent its toppling or other movement on the bottom plate while the other said elements of the mold are disengaged.

---

This invention relates to a glassware forming machine and, more particularly, to improvements in blow molding apparatus adapted to provide the final shape for an article of glassware produced in such machine.

The blow molding apparatus of glassware forming machines generally includes a bottom plate, a body mold which may comprise separable halves, and a neck ring which has separable halves and which is closed at the top of the body mold to support a parison within the cavity defined by the neck ring, the body mold, and the bottom plate. Such apparatus also includes an annular thimble which is located in the center of the neck ring and which engages the top of the parison to define its top edge or "finish." The blow molding apparatus further includes a vertically reciprocable blow head which is movable downwardly onto the thimble to direct air under pressure therethrough into the parison so that it will be shaped to the mold cavity. After blowing the parison to final shape with this apparatus, the blow head is lifted, the neck ring halves are separated and the body mold is removed from engagement with the finished article of glassware which is left standing on the bottom plate. When the body mold comprises two separable halves, they are generally separated from engagement with the article before the neck ring halves are separated and as the blow head is moved upwardly. The thimble is also generally lifted out of engagement with the upper edge of the glassware article before the neck ring halves are separated, and thus the neck ring halves are the last elements to engage the article of glassware as it is left standing on the bottom plate. The movement of the neck ring halves out of engagement with the upper portion of the glassware article sometimes causes it to topple from the bottom plate or to be misaligned therewith so that engagement of the article by take-out tongs may be made difficult or impossible.

It is the general object of the present invention to provide a blow molding apparatus having means particularly adapted to center and steady a finished article of glassware on the bottom plate as the body mold and neck ring halves are separated out of engagement with the article.

As will be understood from a more detailed description hereinafter, this is accomplished in accordance with the present invention by improvements in the blowhead, thimble and neck ring halves which cooperate to hold the thimble in engagement with the article of glassware as the blowhead is elevated and as the neck ring halves are separated. The thimble thus centers and retains the article of glassware in position on the bottom plate, and it is the last element to engage the standing article.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is a view similar to FIG. 1, but it shows the blow mold halves being separated during initial upward movement of the blowhead;

Figure 1:
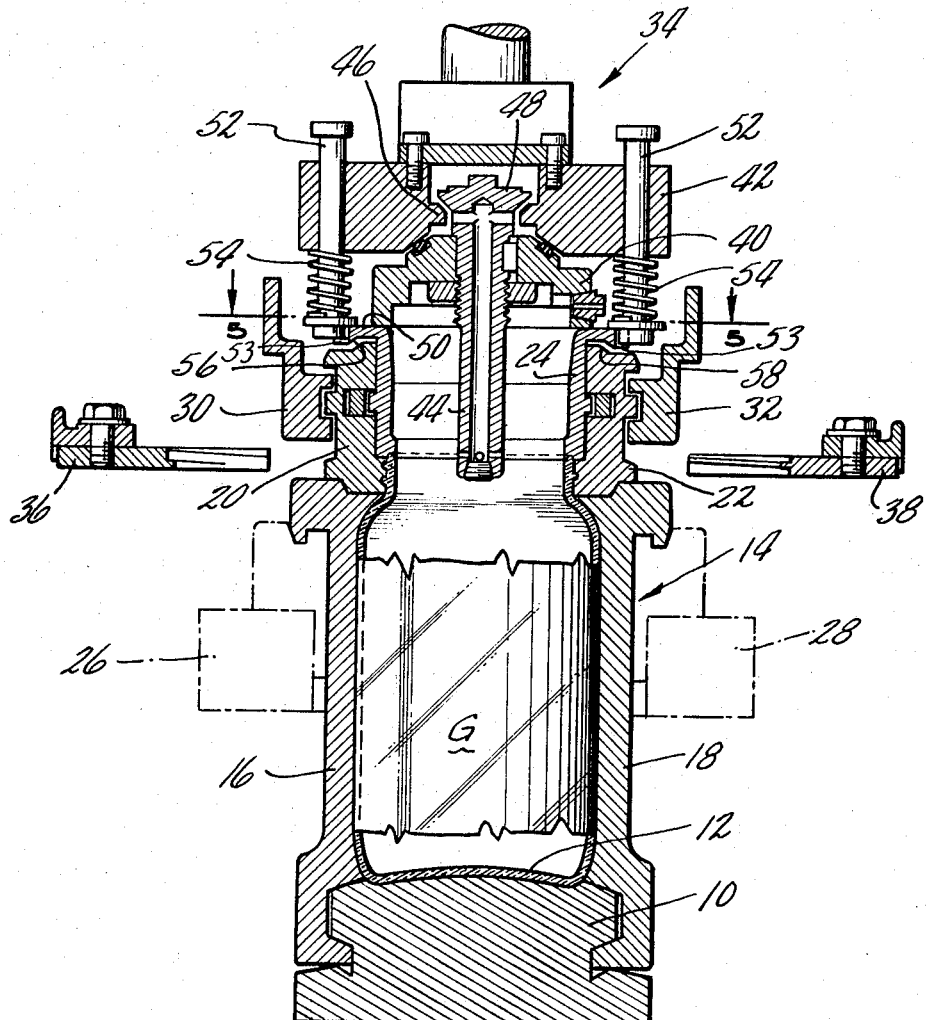
FIG. 1 is a vertical cross sectional view through the blow mold of a blow molding apparatus, showing the mold and neck ring halves closed and with the blowhead lowered in the position it assumes for blowing a glassware article.

As shown in FIG. 1, there is a bottom plate 10 provided to define the bottom wall 12 of an article of glassware G which is blown into final shape over the bottom plate 10 in a cavity defined by said bottom plate and a body mold 14 and other mold defining elements to be identified. In the form shown, the body mold 14 comprises two separable halves 16 and 18 which when closed upon each other engage the bottom plate 10 as shown in FIG. 1. The other elements completing the mold cavity comprise a neck ring which includes two separable halves 20 and 22, and an annular thimble 24. It will be seen that the neck ring halves 20 and 22 are closed upon the neck portion of the article of glassware G and then the body mold halves 16 and 18 are closed around the body portion of the article and somewhat around the neck ring halves 20 and 22. The mold halves 16 and 18 are opened and closed by movement of mold arms 26 and 28, and the neck ring halves are opened and closed by neck ring arms 30 and 32. The annular thimble 24, which completes the mold cavity, is disposed within the neck ring in engagement with the top edge or finish of the article of glassware G. The bottom surface 25 of the thimble also engages an internal annular shoulder 27 formed on the neck ring halves 20 and 22.

The molding apparatus is completed by a blowhead which is indicated generally by the reference numeral 34. This blowhead moves down upon the thimble 24, and it incorporates means for introducing air under pressure through the thimble into the mold cavity to blow a parison into the finally shaped article of glassware G. After blowing the article of glassware, the blowhead 34 is elevated slightly to release the force on the thimble and the air pressure in the mold just prior to initial opening movement of the neck ring and mold halves. Then, as the mold and neck ring halves are separated, the blowhead and neck ring are lifted further to permit the tongs 36 and 38 of a pair to move into engagement with the neck portion of the article of glassware G. Then, the bottom plate 10 is lowered. It will be observed in FIG. 1 that the tongs 36 and 38 are slightly above that portion of the neck of the article of glassware which they are to grip. In order to provide for gripping of the article by the tongs, the bottom plate 10 is moved upwardly from the position shown in FIGS. 1 and 2 to the position shown in FIG. 6, this bringing the article of glassware into proper position by engagement by the tongs.

In keeping with the present invention, improvements are incorporated in the blowhead 34, in the construction of the thimble 24, and in the construction of the neck ring halves 20 and 22.

The vertically reciprocable blowhead 34 includes a centerpiece 40 and a carrier ring 42. The centerpiece 40 is annular and it is adapted to engage the top of the thimble or thimble ring 24. The said centerpiece rigidly supports an air nozzle member 44 at its center, the nozzle projecting vertically downwardly from the centerpiece to introduce air under pressure to the parison in the mold cavity when the blowhead 34 and centerpiece 40 are shifted downwardly to the position shown in FIG. 1. The centerpiece and nozzle member 44 are movable a limited distance vertically relative to the carrier ring 42 whose central opening is defined by a shoulder 46 which is adapted to engage the underside of a head 48 on the nozzle member 44 and to lift it and the centerpiece 40 when the blowhead 34 and its carrier ring 42 are elevated. It will be understood from the drawings that as the blowhead 34 moves downwardly, the centerpiece 40 will engage the thimble 24 before the blowhead has completed its downward movement. The blowhead carrier ring 42 continues to descend to the position shown in FIG. 1 wherein it presses the centerpiece 40 downwardly in engagement with the thimble 24. It is in this position that the blowhead is adapted to introduce air through the nozzle 44 into the mold cavity.

It will also be observed that the thimble 24 is adapted in accordance with the present invention to include a radially outwardly extending flange 50. This flange 50 extends over the top of the neck ring halves 20 and 22 when they are closed as shown in FIGS. 1 and 2. This flange is provided for two purposes, to provide means for cooperation with the carrier ring 42 and to provide means for cooperation with the blow mold halves 20 and 22.

Figure 5:
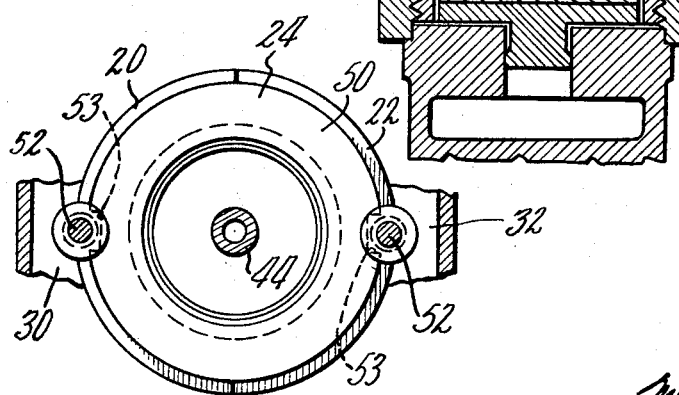
FIG. 5 is a horizontal cross sectional view taken as indicated by line 5—5 of FIG. 1.

In cooperating with the thimble flange 50, the carrier ring 42 is provided with a plurality of circumaxially spaced pins 52, 52 which are vertically slidable in the said carrier ring and which are positioned to reside in opposed peripheral notches 53, 53 (FIG. 5) in the thimble flange 50. This assures centering of the thimble. A coil spring 54 surrounds each pin 52 and is associated therewith to bias its pin downwardly toward engagement with the thimble flange 50. Thus, as the blowhead 34 is lowered toward the position shown in FIG. 1, the pins 52, 52 will engage the thimble flange 50 to hold the thimble down and in engagement with the top of the glassware article G. Also, as the blowhead 34 starts to move upwardly, as shown in FIG. 2, the pins 52, 52 will continue to hold the thimble down as the carrier ring 42 and centerpiece 40 move upwardly with the blowhead.

The thimble flange 50 and the neck ring halves 20 and 22 are adapted for cooperation by providing a cam surface 56 on the underside of the flange 50 for engagement with a cooperating cam surface 58 provided on each neck ring half 20 and 22. These cam surfaces 56 and 58 are so constructed and arranged that as the neck ring halves 20 and 22 are separated enough to release the article of glassware, the cam surfaces will engage and by their engagement lift the thimble 24 out of engagement with the top edge or finish of the article of glassware. The purpose and advantage of doing this will be understood more fully from the following resume of operation.

An article of glassware to be formed at the blow molding station with the aforedescribed apparatus is carried into position over the bottom plate 10 in the form of a parison, the said parison being supported in depending relationship from the neck ring halves 20 and 22 which are closed on the parison. At this time, the thimble 24 is disposed within the closed neck ring and merely rests in the position shown in FIG. 1 on the top edge or finish of the parison.

When the parison is in position, the body mold halves 16 and 18 are closed by the arms 26 and 28 to the position shown in FIG. 1 wherein they engage the bottom plate 10 and wherein they engage and locate the closed condition of the neck ring halves 20 and 22. Then, the blowhead 34 is moved downwardly toward the thimble 24 and the neck ring halves. The thimble flange 50 is engaged first by the pins 52, 52 to exert a downward force on the thimble which is effective to hold it in position in engagement with the top edge or finish of the parison. The blowhead 34 continues to descend until the centerpiece 40 engages the top of the thimble as shown in FIG. 1 and until the carrier ring 42 moves downwardly to exert additional downward force on the centerpiece. In this position, which is shown in FIG. 1, the nozzle member 44 is cleared to introduce air under pressure to the interior of the parison and to blow it into the final shape defined by the mold cavity within the bottom plate, the mold halves, the neck ring halves, and the thimble.

When the blowing operation is completed and the blowhead has been lifted up a slight amount to release the pressure, the blow mold arms 26 and 28 start to move outwardly and thus separate the blow mold halves 16 and 18 as shown in FIG. 2. It will be noted that in initial upward movement of the blowhead, the carrier ring 42 engages the head 48 on the nozzle member 44 and thus starts to lift the centerpiece 40 off the thimble as is also shown in FIG. 2. However, it will be observed that the pins 52, 52 still engage the thimble flange 50 to hold the thimble 24 down so that the said thimble will hold the article of glassware G in centered position and in proper place on the bottom plate 10.

Figure 3:
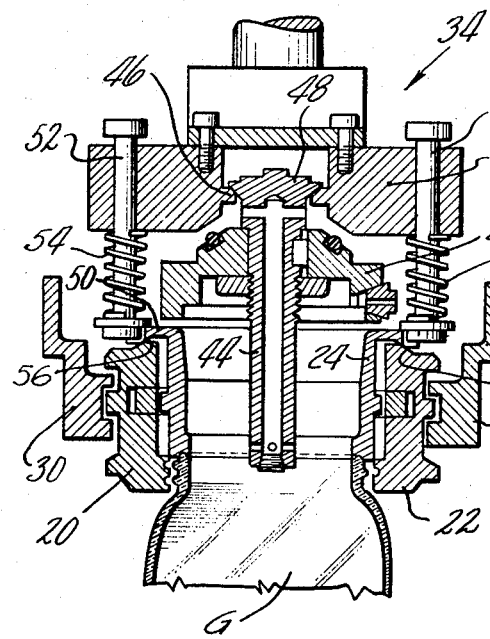
FIG. 3 is similar to the other views but shows only the upper portion of the mold apparatus with the elements in position just after the neck ring halves have been separated out of engagement with the article of glassware.
Figure 4:
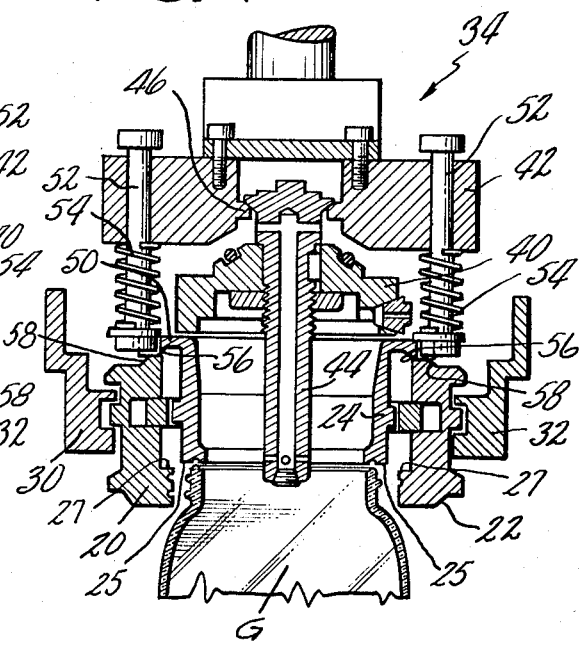
FIG. 4 is a view similar to FIG. 3, but it illustrates how the neck ring halves cooperate with the blowhead to lift the thimble out of engagement with the top edge of the glassware article.

Next, the neck ring arms 30 and 32 start to move outwardly and they carry the neck ring halves 20 and 22 laterally or horizontally outwardly as is shown in FIG. 3. During the outward movement of the neck ring halves 20 and 22, their cam surfaces 58, 58 engage the cooperating cam surface 56 on the thimble flange 50, and continued outward movement of the neck ring halves 20 and 22 causes these cam surfaces to lift the thimble from the position shown in FIG. 3 to the position shown in FIG. 4. When so lifted, the thimble will clear the top edge of the article of glassware G, this taking place after the neck ring halves have become disengaged from the article. As a result, the thimble is the last element, other than the bottom plate to engage the article of glassware and the thimble tends to steady the article on the bottom plate.

Figure 6:
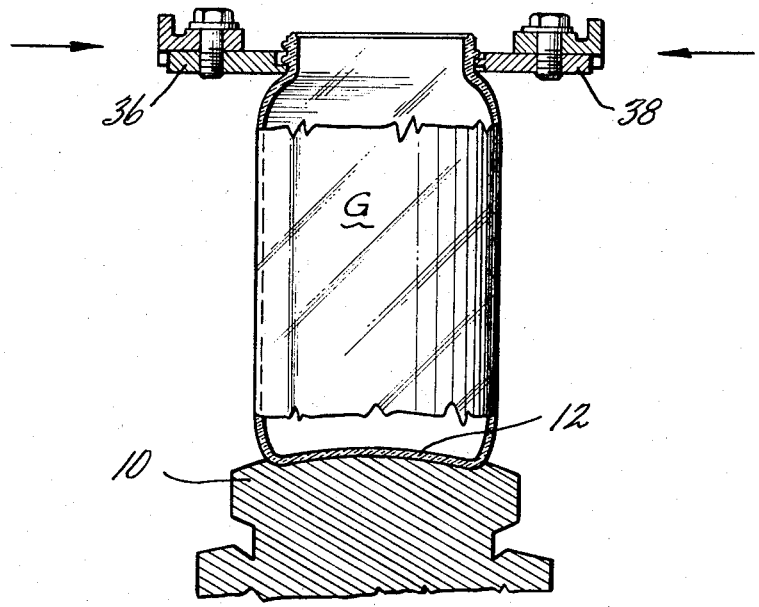
FIG. 6 is a vertical cross sectional view showing the article of glassware as it is left standing on the bottom plate and with the take-out tongs moving into engagement with the article.

The blow mold halves will continue to spread or separate as will the neck ring halves, and the blowhead 34 will move on upwardly to a remote position with respect to the article of glassware. At about this time, the bottom plate 10 is moved upwardly by the glassware forming machine to the position shown in FIG. 6. Then, the tongs 36 and 38 are moved inwardly into engagement with the article as shown in FIG. 6 and the bottom plate then lowers to the position of FIGS. 1 and 2 for the next blow molding operation.

A further advantage in the foregoing construction resides in the cam surfaces 56 and 58. These surfaces prevent the thimble 24 from assuming its lowermost position in the neck ring halves 20 and 22 until those halves are nearly closed. This greatly reduces wear on the surfaces 25 and 27 (FIG. 4) and thus minimizes the chance for molten glass leakage between the neck ring and thimble that can be caused by such wear.

The invention claimed is:

1. In a glassware forming machine having blow molding apparatus of the type which includes a bottom plate, a body mold, separable neck ring halves, an annular thimble disposed within the neck ring, all of which elements cooperate to define a mold cavity to form an article of glassware in a vertical position resting on the bottom plate and with its top edge or finish engaged by the thimble, and which also includes a vertically reciprocable blowhead having a centerpiece movable into engagement with the top of the thimble to introduce air therethrough for blowing a parison supported by the neck ring into the shaped article of glassware in the mold cavity, improvements in the blowhead, thimble and neck ring comprising means on said blowhead biased to engage said thimble and hold it down prior to and after engagement therewith by the centerpiece during downward and upward movement, respectively, of the blowhead, and cooperating cam means on said thimble and neck ring halves adapted to lift said thimble out of engagement with the glassware article against the force of said biased means after said neck ring halves have been separated and are out of engagement with the glassware article.

2. Improvements in blow molding apparatus as set forth in claim 1 wherein said cooperating cam means are also adapted to prevent lowering of said thimble in said neck ring halves until said halves are nearly closed.

3. Improvements in blow molding apparatus as set forth in claim 1 wherein said cooperating cam means on said thimble and neck ring halves are adapted to lift said thimble out of engagement with the glassware article against the force of said biased means after said neck ring halves have been separated and are out of engagement with the glassware article and after initial upward movement of said blowhead with its centerpiece.

4. In a glassware forming machine having blow molding apparatus of the type which includes a bottom plate, a body mold, separable neck ring halves, an annular thimble disposed within the neck ring, all of which elements cooperate to define a mold cavity to form an article of glassware in a vertical position resting on the bottom plate and with its top edge or finish engaged by the thimble, and which also includes a vertically reciprocable blowhead having a centerpiece movable into engagement with the top of the thimble to introduce air therethrough for blowing a parison supported by the neck ring into the shaped article of glassware in the mold cavity, improvements in the blowhead, thimble and neck ring comprising a radially outwardly extending flange on the top of said thimble, a plurality of circumaxially spaced pins slidable vertically in said blowhead and associated springs which bias the pins downwardly to engage the thimble flange and hold the thimble down prior to and after engagement therewith by the centerpiece during downward and upward movement, respectively, of the blowhead, and cooperating cam means on said thimble flange and neck ring halves adapted to lift said thimble out of engagement with the glassware article against the bias of said springs after said neck ring halves have been separated and are out of engagement with the glassware article.

5. Improvements in blow molding apparatus as set forth in claim 4 wherein said cooperating cam means are adapted to lift said thimble out of engagement with the glassware article after said neck ring halves have been separated and are out of engagement with the glassware article and after initial upward movement of said blowhead with its centerpiece.

6. Improvements in blow molding apparatus as set forth in claim 4 wherein said thimble flange is provided with notches cooperating with said pins to assure centering of the thimble.

7. In a glassware forming machine having blow molding apparatus of the type which includes a bottom plate, separable mold halves, separable neck ring halves, an annular thimble disposed within the neck ring, all of which elements cooperate to define a mold cavity to shape an article of glassware in a vertical position resting on the bottom plate and with its top edge or finish engaged by the thimble, and which also includes a vertically reciprocable blowhead, the improvements comprising a carrier ring for the blowhead, a centerpiece carried by the carrier ring for limited vertical movement relative thereto and which engages the top of the thimble during downward movement of the blowhead and is then held down by the carrier ring and which is lifted by the carrier ring after initial upward movement of the blowhead, a radially outwardly extending flange on the top of the thimble, a plurality of circumaxially spaced pins slidable vertically in said carrier ring and associated springs which bias the pins downwardly to engage the thimble flange and hold the thimble down prior to and after engagement therewith by the centerpiece during downward and upward movement, respectively, of the blowhead, and cooperating cam means on the thimble flange and neck ring halves adapted to lift said thimble out of engagement with the glassware article against the bias of said springs after said neck ring halves have been separated out of engagement with the glassware article and after initial upward movement of said blowhead.

References Cited

UNITED STATES PATENTS

| | | | |
|---|---|---|---|
| 582,950 | 5/1897 | Proeger | 65—231 |
| 1,394,092 | 10/1921 | Huttun | 65—261 XR |
| 1,995,276 | 3/1935 | Howard | 65—261 XR |
| 2,310,721 | 2/1943 | Watt | 65—260 |
| 2,645,059 | 7/1953 | Rowe. | |
| 3,171,728 | 3/1965 | Andersen | 65—81 XR |

FOREIGN PATENTS

| | | |
|---|---|---|
| 65,073 | 6/1914 | Austria. |
| 28,128 | 10/1932 | Netherlands. |

DONALL H. SYLVESTER, *Primary Examiner.*

F. W. MIGA, *Assistant Examiner.*